US012611795B2

(12) United States Patent (10) Patent No.: US 12,611,795 B2
Abrino (45) Date of Patent: Apr. 28, 2026

(54) HIGHLY-INSULATED INGOT MOLD

(71) Applicant: HarbisonWalker International Holdings, Inc., Moon Township, PA (US)

(72) Inventor: Donald Abrino, Curwensville, PA (US)

(73) Assignee: HarbisonWalker International Holdings, Inc., Moon Township, PA (US)

( * ) Notice: Subject to any disclaimer, the term of this patent is extended or adjusted under 35 U.S.C. 154(b) by 297 days.

(21) Appl. No.: 17/895,268

(22) Filed: Aug. 25, 2022

(65) Prior Publication Data

US 2023/0069059 A1 Mar. 2, 2023

Related U.S. Application Data

(60) Provisional application No. 63/237,633, filed on Aug. 27, 2021.

(51) Int. Cl.
| | |
|---|---|
| *B28B 7/00* | (2006.01) |
| *B28B 7/36* | (2006.01) |
| *C01F 5/00* | (2006.01) |
| *C01F 5/02* | (2006.01) |
| *F27D 1/00* | (2006.01) |

(Continued)

(52) U.S. Cl.
CPC ................. *B28B 7/36* (2013.01); *C01F 5/02* (2013.01); *B22C 1/00* (2013.01); *B22C 3/00* (2013.01); *B22D 7/00* (2013.01); *B22D 7/06* (2013.01); *B22D 7/068* (2013.01); *B22D 41/00* (2013.01); *B22D 41/02* (2013.01); *B28B 7/00* (2013.01); *C01F 5/00* (2013.01); *F27B*

*2014/0843* (2013.01); *F27B 2014/104* (2013.01); *F27D 1/00* (2013.01); *F27D 1/0006* (2013.01);

(Continued)

(58) Field of Classification Search
CPC ....................................................... B22D 7/06
See application file for complete search history.

(56) References Cited

U.S. PATENT DOCUMENTS

| | | | | | |
|---|---|---|---|---|---|
| 1,963,481 | A | * | 6/1934 | Willcox | F27D 11/06 |
| | | | | | 373/154 |
| 1,965,080 | A | * | 7/1934 | Kemmer | F27B 3/08 |
| | | | | | 373/72 |

(Continued)

FOREIGN PATENT DOCUMENTS

| | | | | |
|---|---|---|---|---|
| EP | 375588 | B1 | * 2/1996 | ............. C04B 35/80 |
| GB | 673320 | | 6/1952 | |

(Continued)

OTHER PUBLICATIONS

The Facts on Rocks and Slag Wool, Pub. No. N 020, North American Insulation Manufacturers Association, Alexandria, VA, 1992. (Year: 1992).*

(Continued)

*Primary Examiner* — JaMel M Nelson
*Assistant Examiner* — Andres E. Behrens, Jr.
(74) *Attorney, Agent, or Firm* — RENNER, OTTO, BOISSELLE & SKLAR, LLP

(57) ABSTRACT

An ingot mold for curing fused and melted material is provided. The ingot mold includes a steel box, a foamed carbon layer, and a graphite block layer. The foamed carbon layer is formed inside the steel box. The graphite block layer is formed inside the steel box.

8 Claims, 3 Drawing Sheets

(51) Int. Cl.

| | |
|---|---|
| *F27D 1/10* | (2006.01) |
| *B22C 1/00* | (2006.01) |
| *B22C 3/00* | (2006.01) |
| *B22D 7/00* | (2006.01) |
| *B22D 7/06* | (2006.01) |
| *B22D 41/00* | (2006.01) |
| *B22D 41/02* | (2006.01) |
| *F27B 14/08* | (2006.01) |
| *F27B 14/10* | (2006.01) |
| *F27D 1/04* | (2006.01) |
| *F27D 1/18* | (2006.01) |

(52) U.S. Cl.
CPC ........ *F27D 1/003* (2013.01); *F27D 2001/047* (2013.01); *F27D 1/10* (2013.01); *F27D 1/1808* (2013.01)

(56) References Cited

U.S. PATENT DOCUMENTS

| | | | | |
|---|---|---|---|---|
| 2,925,636 | A | 2/1960 | Darby | |
| 3,182,363 | A | 5/1965 | Ferree | |
| 3,358,067 | A * | 12/1967 | Dillon | F27D 11/04 |
| | | | | 373/88 |
| 3,514,069 | A * | 5/1970 | Daley | B22D 7/06 |
| | | | | 249/174 |
| 3,520,670 | A * | 7/1970 | Schlehr | C03B 18/16 |
| | | | | 65/168 |
| 3,623,537 | A | 11/1971 | Hilton et al. | |
| 3,624,757 | A | 11/1971 | Fieldhouse et al. | |
| 3,973,076 | A * | 8/1976 | Scott, Jr. | F27B 3/12 |
| | | | | 373/45 |
| 4,325,694 | A | 4/1982 | Bergman | |
| 4,389,724 | A * | 6/1983 | Wooding | F27B 11/00 |
| | | | | 373/33 |
| 5,143,777 | A * | 9/1992 | Mills | B22C 1/165 |
| | | | | 106/605 |
| 5,667,742 | A * | 9/1997 | Dwivedi | B22F 3/1021 |
| | | | | 419/36 |
| 8,517,083 | B2 | 8/2013 | Bracher | |
| 9,033,024 | B2 | 5/2015 | Prest et al. | |
| 9,528,195 | B2 | 12/2016 | Moon et al. | |
| 2007/0057402 | A1 * | 3/2007 | Da Silva | B22C 9/22 |
| | | | | 264/220 |
| 2009/0000760 | A1 | 1/2009 | Kang et al. | |
| 2014/0041825 | A1 * | 2/2014 | Faoro | B22D 7/005 |
| | | | | 164/47 |
| 2015/0072133 | A1 * | 3/2015 | Ghasemi | B32B 5/18 |
| | | | | 428/312.2 |
| 2015/0158205 | A1 * | 6/2015 | Sotozaki | C04B 41/009 |
| | | | | 428/312.2 |
| 2019/0009328 | A1 | 1/2019 | Zhang et al. | |
| 2021/0148637 | A1 * | 5/2021 | Kuk | C30B 15/10 |
| 2022/0381513 | A1 * | 12/2022 | Snow | F27D 1/0006 |

FOREIGN PATENT DOCUMENTS

| | | | | | | |
|---|---|---|---|---|---|---|
| GB | | 673320 | A | * | 6/1952 | B22C 3/00 |
| JP | | 2005211937 | A | * | 8/2005 | |
| JP | | 2005238275 | A | * | 9/2005 | |
| RU | | 2710176 | C1 | | 12/2019 | |
| WO | WO-2017178109 | A1 | * | 10/2017 | | |
| WO | WO-2020/261971 | A1 | | 12/2020 | | |

OTHER PUBLICATIONS https://www.jstage.jst.go.jp/article/isijinternational/advpub/0/advpub_ISIJINT-2021-066/_pdf Zhang, 2021. (Year: 2021).* https://rongshengrefractory.com/graphite-blocks-for-sale/ Graphite Blocks for Sale, 2017 (Year: 2017).*

JP-2005211937-A (Tsuchida ) Aug. 2005 (online machine translation), [Retrieved on May 8, 2025]. Retrieved from: Espacenet (Year: 2005).*

JP 2005238275 A (Goto) Sep. 2005 (online machine translation), [Retrieved on May 8, 2025]. Retrieved from: Espacenet (Year: 2005).*

Written Opinion of the International Preliminary Examining Authority issued in corresponding International Application No. PCT/US2022/041486 dated Oct. 13, 2023.

International Search Report issued in related International Patent Application No. PCT/US2022/041486 dated Dec. 19, 2022.

Written Opinion of the International Searching Authority issued in related International Patent Application No. PCT/US2022/041486 dated Dec. 19, 2022.

International Preliminary Report on Patentability in corresponding International Application No. PCT/US2022/041486 dated Dec. 6, 2023.

Website https://www.industrialheating.com/articles/84074-carbon-foam-a-next-generation-structural-material, printed out Apr. 18, 2023.

Office Action issued in corresponding European Patent Application No. 22 797 133.0 dated Jan. 3, 2025.

\* cited by examiner

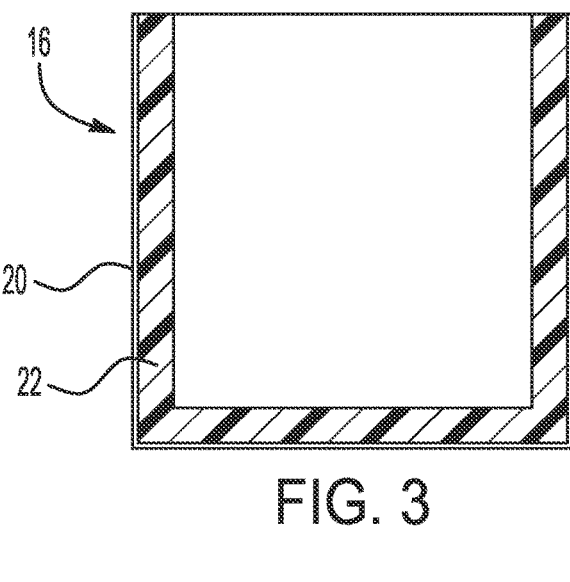
FIG. 3
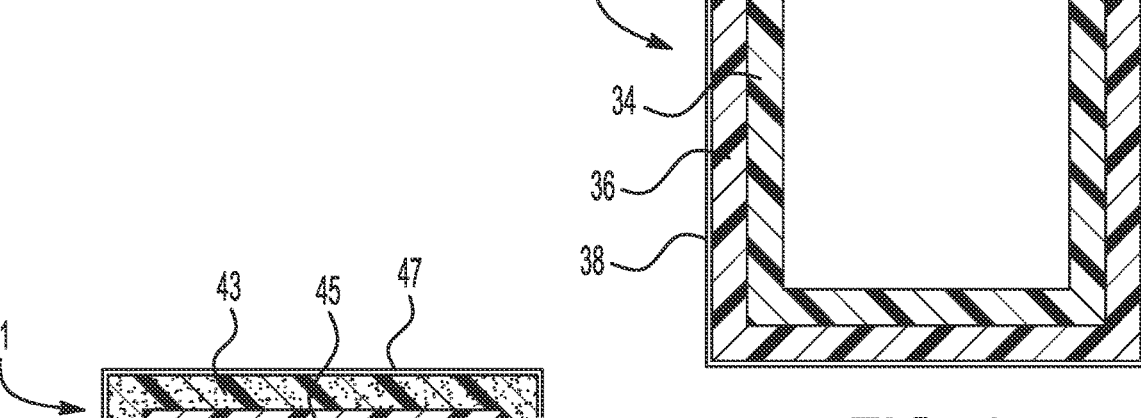
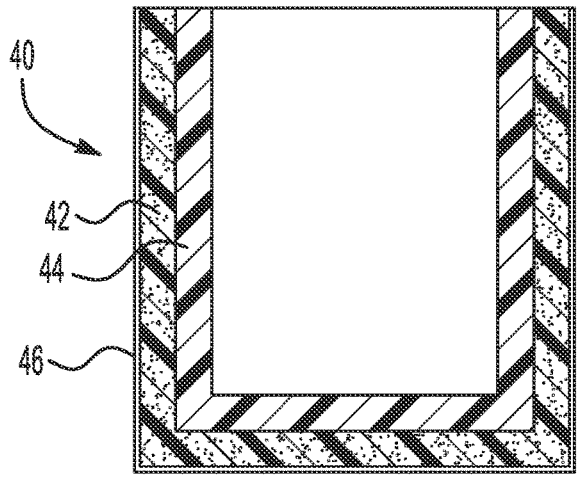
FIG. 4
FIG. 5

HIGHLY-INSULATED INGOT MOLD

CROSS-REFERENCE TO RELATED APPLICATION

This application claims the benefit of U.S. Provisional Application No. 63/237,633 filed Aug. 27, 2021, which is hereby fully incorporated herein by reference.

FIELD OF THE INVENTION

The present invention relates generally to the use of ingot molds to manufacture ingots or fused cast shapes of electro-fused material, and, more particularly, to providing an ingot mold with the ability to produce an ingot or fused cast shape of electro-fused material which, being highly insulated, cools slowly and has an increased crystal size and greater uniformity.

BACKGROUND OF THE INVENTION

The manufacturing of many electro-fused materials and electro-fused shapes requires a slow cool down to obtain proper crystal size and properties, especially when making such electro-fused materials through the forming of either a fused cast shape or an ingot intended to be later crushed and sized to achieve desired synthetic fused grain.

For example, when manufacturing fused magnesia (MgO) for conversion into high-quality fused MgO grain to be used in refractory products, the crystal size of the fused MgO grain is important. A Higgins furnace design, as shown in the furnace 2 illustrated in FIG. 1, is most often used to achieve this fusion process. This type of furnace 2 uses a large, water-cooled ingot chamber 4. To maintain a required melting temperature in the ingot chamber 4, only the center 6 of the ingot is melted by graphite electrodes 12 that are powered through an AC transformer 13. The materials being fused in the ingot chamber 4 insulate the melted center 6 of the ingot from the outside wall 8 of the ingot chamber 4. This insulation is only partially adequate and, as a result, the fused MgO develops a proper crystal size only in the center 6 of the ingot chamber 4.

The furnace 2 and furnaces designed in this manner are very inefficient. Once the MgO in the ingot is fused, the graphite electrodes 12 are removed from the furnace 2, and the ingot chamber 4 is moved away from the furnace 2, thereby allowing the MgO ingot to cool. This cooling process normally takes between one and three days. After cool down is complete, the resultant MgO ingot is removed from the chamber 4. The outer portion of the ingot 10 that is unfused and has not been melted is then removed and separated from the electro-fused center 6 of the ingot. Only the center 6 of the ingot is suitable for the fused MgO grain product. The removed outer portion of the ingot 10, which is often more than 40% of the total ingot weight, is either disposed of or recycled back to the furnace 2. Thus, the yield of fused MgO grain from the ingot mold chamber 4 of the Higgins furnace 2 is often less than 60%. In addition, a sufficient amount of labor and cost is required just to remove the outer portion 10, thereby making the Higgins furnace 2 design even more inefficient.

FIG. 2 illustrates a conventional tilt furnace 14 and a standard practice steel and graphite ingot mold 16 into which material 18 that has been melted and fused in the tilt furnace 14 is poured. Within the standard practice ingot mold 16, the melted and fused material 18 is cured into an ingot or a fused cast shape. The tilt furnace 14 can be used as an alternative to the Higgins furnace 2. A source material of MgO or another material is charged to the tilt furnace 14 through the charging door 26. Similar to the process of the Higgins furnace 2, the center of the material to be the fused and melted material 18 is melted by graphite electrodes 28 that are powered through an AC transformer 15. The resultant fused and melted material 18 is poured out of the furnace 14 through a pour spout in the furnace 24 into the standard practice ingot mold 16, while the non-melted material 30 remains in the tilt furnace 14.

The standard practice ingot mold 16, which is illustrated schematically in FIG. 3 when empty, is typically a water-cooled or air-cooled steel box 20 lined with about two inches of dense graphite block 22 on the bottom and side walls of the box 20. Fused and melted material 18 will reside in the mold long enough to freeze the surface due to the high heat loss through the highly heat conductive steel and graphite materials. As a result, an ingot or a fused cast shape is produced. Water cooling enhances this process, although air cooling or additional residence time in the mold can be utilized if crystal size is not important. Regardless, after the surface of the fused and melted material 18 is frozen, the resultant ingot or fused cast shape may be removed from the standard practice ingot mold 16 while still white hot and moved to a designated cooling area or a secondary heating furnace.

However, while this is a much more efficient process with less waste that is the process utilizing the Higgins furnace 2, the process still results in a cooling of the fused and melted material 18 that is undesirably rapid. The standard practice ingot mold 16 is effectively a non-insulated design that relies on rapid cooling to ensure the integrity of the steel box 20, thereby resulting in an ingot or a fused cast shape with crystals of a very small size.

A double lined graphite ingot mold 32, as is illustrated when empty in FIG. 4, can be utilized to decrease the heat flux causing the rapid cooling. Such an ingot mold 32 includes a water-cooled steel box 38 lined with a first two-inch dense graphite block 34. The first two-inch dense graphite block 34 is then lined with a second two-inch dense graphite block 36. The result of this doubling of graphite block thickness reduces the heat flux, but not to an extent of having a dramatic impact on the increase in crystal size of the ingot or the fused cast shape.

Occasionally, the tilt furnace 14 has been used in conjunction with large, heated holding furnaces or highly insulated holding furnaces for holding hot ingots or fused cast shapes with solidified outer surfaces that have been removed from the ingot mold while still having a liquid center, thereby slowing down the cooling in order to at least obtain larger crystals in the center of the ingot or the fused cast shapes. However, this process is costly and not universally suitable for all materials. As such, processes utilizing tilt furnaces 14 are not suitable when large fused material crystals or large fused MgO crystals are required to be produced.

SUMMARY OF THE INVENTION

In accordance with an embodiment of the present invention, there is provided an ingot mold for curing fused and melted material. The ingot mold includes a steel box, a foamed carbon layer, and a graphite block layer. The foamed carbon layer is formed inside the steel box. The graphite block layer is formed inside the steel box.

In accordance with another embodiment of the present invention, there is provided an ingot mold for curing fused and melted material. The ingot mold includes a steel box, an oxide-based insulation material layer, a foamed carbon layer, and a graphite block layer. The oxide-based insulation material layer lines an inner surface of the steel box. The foamed carbon layer is formed over the oxide-based insulation material layer. The graphite block layer is formed over the oxide-based insulation material layer.

The present invention is designed to address the drawbacks of the conventionally used melting methods described above. This will become apparent from the following description of the invention taken together with the accompanying drawings and claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 3 is a schematic illustration of an example conventional ingot mold lined with a single block of dense graphite;

FIG. 4 is a schematic illustration of an example conventional ingot mold lined with two blocks of dense graphite;

FIG. 5 is a schematic illustration of an example ingot mold according to an embodiment of the invention;

DETAILED DESCRIPTION OF THE INVENTION

Figures 1, 2:
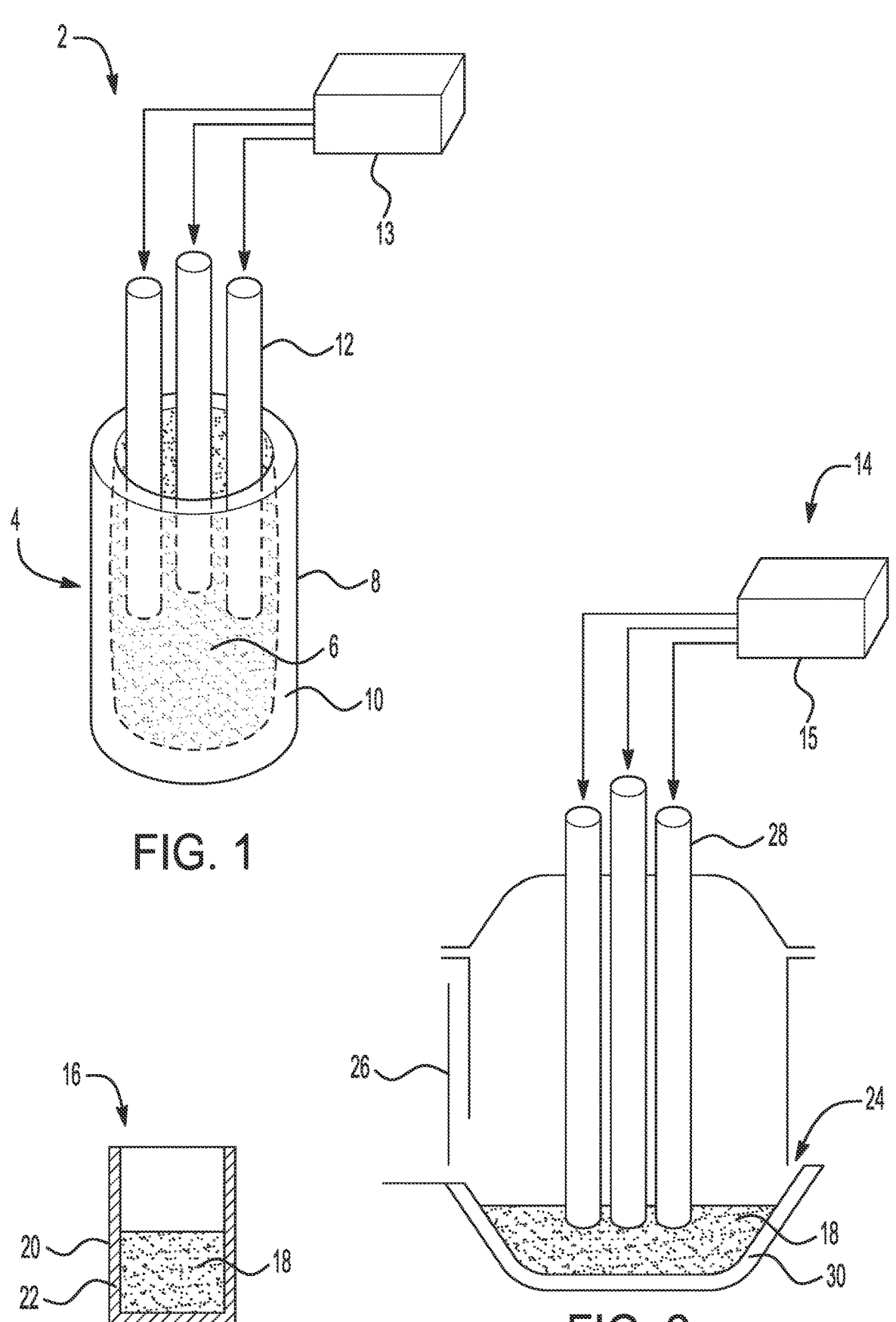
FIG. 1 is a schematic illustration of an example conventional Higgins furnace.
FIG. 2 is a schematic illustration of an example conventional tilt furnace and an example ingot mold into which ingot or cast material that is melted and fused in the tilt furnace is poured.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. In addition, descriptions of functions and constructions that are well known to one of ordinary skill in the art may be omitted for increased clarity and conciseness. The drawings may not be to scale, and the relative size, proportions, and depiction of elements in the drawings may be exaggerated for clarity, illustration, and convenience.

Foamed carbon has a unique set of properties, including, but not limited to, a high resistance to temperature complemented with a very low thermal conductivity. This enables the pouring of fused and melted material, such as MgO, into a foamed carbon containing ingot mold from a spout of a conventional tilt furnace, such as the tilt furnace 14 that was illustrated in FIG. 2. The foamed carbon enhances the ingot mold with a very low thermal conductivity while simultaneously withstanding the high temperatures of the fused and melted material, the ingot, or the fused cast shape in the ingot mold. This will enable the temperature of the fused and melted material, the ingot, or the fused cast shape to be held for increased periods, thereby allowing for the formation of large crystals.

Foamed carbon can be applied either as a surface layer of an ingot mold in contact with the fused and melted material, the ingot, or the fused cast shape, or as a back-up layer, i.e. insulation layer, of an ingot mold that backs up a surface layer in contact with the fused and melted material, the ingot, or the fused cast shape. The surface layer may be a graphite surface layer or a surface layer formed from another suitable material. One layer may be directly lined on an inner surface of another layer. One layer may line an entirety of an inner surface of another layer.

Most common constructions can be used to configure the various embodiments of the ingot mold including the foamed carbon. The heavy frame of the water-cooled or air-cooled steel box 20 serves to hold the graphite block 22 in place for the bottom and the sidewalls of the standard practice ingot mold 16. The ingot mold including the foamed carbon has an increased overall thickness due to the inclusion of multiple insulation layers. Ideally, whether being used as the surface layer or the back-up layer of an ingot mold, the sizing of a foamed carbon component should accommodate one full heat, i.e. ingot creation, while still allowing the top of an ingot mold to be constructed with a steel frame.

A lid corresponding with the construction of the ingot mold can be placed on top of the ingot mold by machinery as soon as the pouring of the fused and melted material into the ingot mold is complete. Examples of such a lid will be described in further detail in the discussion below with respect to inventive embodiments.

Figure 8:
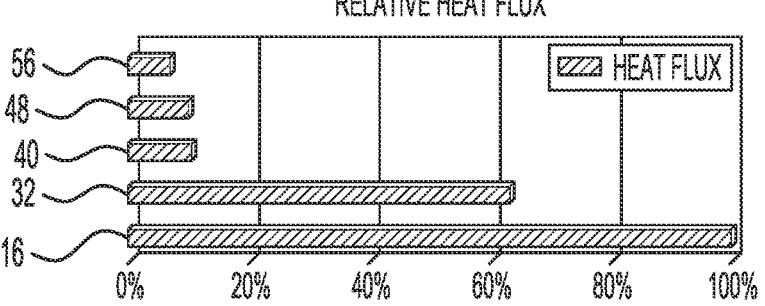
FIG. 8 is a graphical illustration showing the relative heat flux of the ingot molds illustrated in FIGS. 3-7.

To understand the thermal consequences related to the incorporation of foamed carbon in an ingot mold, FIG. 8 shows the relative heat flux of various example mold designs with and without foamed carbon or other oxide-based insulations. "100%" is reflected as being the heat flux of the standard practice ingot mold 16 illustrated in FIG. 3 that is used with a conventional furnace or a tilt furnace having a spout, such as the tilt furnace 14 illustrated in FIG. 2.

Figure 6:
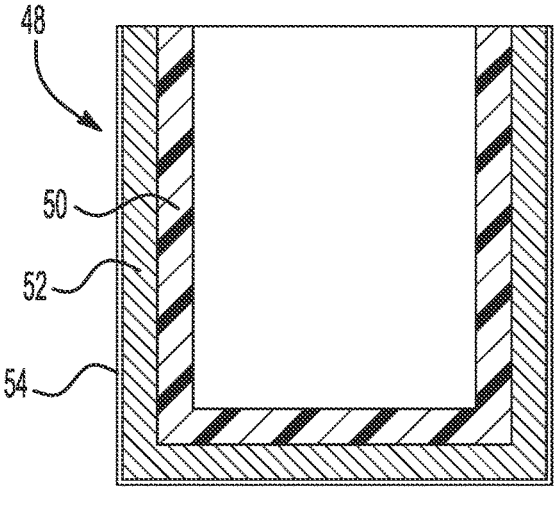
FIG. 6 is a schematic illustration of an example ingot mold according to another embodiment of the invention.
Figure 7:
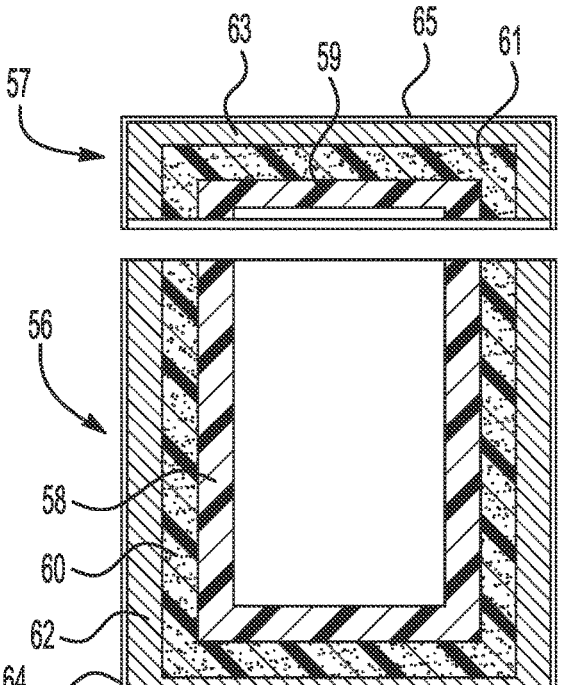
FIG. 7 is a schematic illustration of an example ingot mold according to an additional embodiment of the invention.

More specifically, while the invention is not limited to these examples, FIG. 8 illustrates the relative heat flux between the standard practice ingot mold 16 illustrated in FIG. 3, the double lined graphite ingot mold 32 illustrated in FIG. 4, the graphite and foamed carbon lined ingot mold 40 illustrated in FIG. 5, the graphite and bubble alumina lined ingot mold 48 of FIG. 6, and the graphite, foamed carbon, and bubble alumina lined ingot mold 56 of FIG. 7.

The deficiencies in the standard practice ingot mold 16 illustrated in FIG. 3 and the double lined graphite ingot mold 32 illustrated in FIG. 4 have already been discussed above in the "Background of the Invention". In comparison, the graphite and foamed carbon lined ingot mold 40 illustrated in FIG. 5 is a water-cooled or air-cooled steel box 46 lined with anywhere from one to twelve inches of a layer of foamed graphite 42, i.e. foamed carbon, on an inner surface thereof. A two-inch dense graphite block 44 is then lined over the foamed carbon layer 42.

A lid 41 corresponding with the construction of the graphite and foamed carbon lined ingot mold 40 is placed on top of the graphite and foamed carbon lined ingot mold 40 by machinery as soon as the pouring of the fused and melted material into the graphite and foamed carbon lined ingot mold 40 is complete. The graphite and foamed carbon lined ingot mold lid 41 is a steel frame 47 corresponding with the water-cooled or air-cooled steel box 46. The steel frame 47 is lined with anywhere from one to twelve inches of foamed graphite 43, i.e. foamed carbon, on an inner surface thereof that corresponds with the layer of foamed carbon 42 of the graphite and foamed carbon lined ingot mold 40. A two-inch dense graphite block 45 corresponding with the two-inch dense graphite block 44 of the graphite and foamed carbon lined ingot mold 40 is then lined over the foamed carbon components 60 of the graphite, foamed carbon, and bubble alumina lined ingot mold 56.

The layer of foamed carbon 42 serves to insulate the fused and melted material, the ingot, or the fused cast shape deposited in the graphite and foamed carbon lined ingot mold 40. As such, the thickness of the layer of foamed carbon 42 provided serves to determine the heat flux of the graphite and foamed carbon lined ingot mold 40. Further, the size of the graphite and foamed carbon lined ingot mold 40 and the amount of the fused and melted material deposited therein will affect the thickness of the layer of foamed carbon 42 necessary to maintain the heat flux of the graphite and foamed carbon lined ingot mold 40 at a predetermined amount.

As is shown in FIG. 8, the relative heat flux of the graphite and foamed carbon lined ingot mold 40 illustrated in FIG. 5 is only 10% of the relative heat flux that occurs in the standard practice ingot mold 16. In other words, if all sides of an ingot mold (including the lid) are constructed in accordance with the graphite and foamed carbon lined ingot mold 40, the fused and melted material, the ingot, or fused cast shape deposited in the graphite and foamed carbon lined ingot mold 40 will roughly take nine times longer to cool than fused and melted ingot material or fused cast shape deposited in the standard practice ingot mold 40, thereby serving to have a dramatically increased crystal size from that which is cooled in the standard practice ingot mold 16.

In addition, the standard practice ingot mold 16 is assumed to be within the temperature suitable for crystal growth only for two to four hours after the fused and melted material 18 is poured from the tilt furnace 14 into the standard practice ingot mold 16 for casting. On the other hand, fused and melted material 18 poured from the tilt furnace 14 into the graphite and foamed carbon lined ingot mold 40 will be within the temperature suitable for crystal growth for 18 to 36 hours after casting. This extended crystallization period is also important in production of high quality fused-cast shapes with a reduced frequency of casting defects. This length of cooling afforded by the graphite and foamed carbon lined ingot mold 40 is similar, if not longer, to that which is afforded by the ingot chamber 4 of the Higgins furnace 2. An ingot shape formed in the Higgins furnace 2, which includes the fused and melted ingot or fused cast shape material 6 surrounded and insulated in the ingot chamber 4 by the outer portion of the ingot 10 that is unfused and has not been melted, is typically removed from the ingot chamber 4 in 24 hours. At that time, the temperature of the fused and melted ingot or fused cast shape material 6 is lower than a temperature necessary to grow crystals.

When used as insulation backing behind the graphite block layer 44, the foamed carbon 42 has a temperature resistance that is greater than any conventional oxide-type insulation backing. Even bubble alumina, which is considered to be the most temperature-resistant oxide-based insulation, is only resistive up to 3300° F., which is not high enough to be used behind four inches of graphite block.

For example, the graphite and bubble alumina lined ingot mold 48 illustrated in FIG. 6 is a water-cooled or air-cooled steel box 54 lined with 2.5 inches of bubble alumina 52 on an inner surface thereof. The 2.5-inch bubble alumina layer 52 is then lined with a four-inch dense graphite block 50.

While the graphite and bubble alumina lined ingot mold 48 illustrated in FIG. 6 is indicated in FIG. 8 as having a relative heat flux corresponding with that of the graphite and foamed carbon lined ingot mold 40 illustrated in FIG. 5, the temperature at the interface between the graphite block 50 and bubble alumina layer 52 would exceed 3300° F. temperature, which is the service limit of bubble alumina material. This will result in an early failure of the bubble alumina layer 52, thereby leading to a greater relative heat flux than is shown.

However, if foamed carbon is incorporated as a middle layer between graphite block and oxide-based insulation materials, such as bubble alumina, properties possessed by the foamed carbon will enable oxide-based insulation materials to be used as a lining for the steel box of an ingot mold.

For example, the graphite, foamed carbon, and bubble alumina lined ingot mold 56 of FIG. 7 is a water-cooled or air-cooled steel box 64 lined with 2.5 inches of an oxide-based bubble alumina outer insulating layer 62 on an inner surface thereof. The 2.5-inches of bubble alumina 62 is then lined with anywhere from one to twelve inches of foamed carbon components 60. The foamed carbon components 60 are lined with two inches of graphite block 58.

A lid 57 corresponding with the construction of the graphite, foamed carbon, and bubble alumina lined ingot mold 56 is placed on top of the graphite, foamed carbon, and bubble alumina lined ingot mold 56 by machinery as soon as the pouring of the fused and melted material into the graphite, foamed carbon, and bubble alumina lined ingot mold 56 is complete. The graphite, foamed carbon, and bubble alumina lined ingot mold lid 57 is a steel frame 65 corresponding with the water-cooled or air-cooled steel box 64. The steel frame 65 is lined with 2.5 inches of an oxide-based bubble alumina outer insulating layer 63 on an inner surface thereof that corresponds with the 2.5 inches of the oxide-based bubble alumina outer insulating layer 62 lined on the inner surface of the water-cooled or air-cooled steel box 64 of the graphite, foamed carbon, and bubble alumina lined ingot mold 56. The 2.5-inches of bubble alumina 63 of the lid 57 is lined with anywhere from one to twelve inches of foamed carbon components 61 on an inner surface thereof that corresponds with the foamed carbon components 60 of the graphite, foamed carbon, and bubble alumina lined ingot mold 56. A two-inch dense graphite block 59 corresponding with the two-inch dense graphite block 58 of the graphite, foamed carbon, and bubble alumina lined ingot mold 56 is then lined over the foamed carbon layer 43 of the graphite and foamed carbon lined ingot mold lid 41.

As is the case with the foamed carbon layer 42 illustrated in FIG. 5, the foamed carbon components 60 illustrated in FIG. 7 serve to insulate the fused and melted material, the ingot, or the fused cast shape deposited in the graphite, foamed carbon, and bubble alumina lined ingot mold 56. As such, the thickness of the layer of foamed carbon components 60 provided serves to determine the heat flux of the graphite, foamed carbon, and bubble alumina lined ingot mold 56. Further, the size of the graphite, foamed carbon, and bubble alumina lined ingot mold 56 and the amount of the fused and melted material deposited therein will affect the thickness of the layer of foamed carbon components 60 necessary to maintain the heat flux of the graphite, foamed carbon, and bubble alumina lined ingot mold 56 at a predetermined amount.

As is illustrated in FIG. 8, the graphite, foamed carbon, and bubble alumina lined ingot mold 56 is 7% of that of the standard practice ingot mold 16. Further, since the bubble alumina layer 62 is insulated by the graphite block layer 58 and the foamed carbon layer 60, the temperature at the interface between the foamed carbon layer 60 and the bubble alumina layer 62 is less than 3300° F. and, therefore, within the temperature service limit.

Moreover, it would be understood that, in the graphite, foamed carbon, and bubble alumina lined ingot mold 56 of FIG. 7, due to the positioning of the foamed carbon layer 60, the bubble alumina layer 62 could be replaced by layers of standard technology insulations or other oxide-based insulation materials, thereby yielding even greater reductions in temperature.

In the graphite and foamed carbon lined ingot mold 40 illustrated in FIG. 5, while the layer of foamed carbon 42 serves as a back-up or insulation layer of the ingot mold 40 that backs up the graphite block 44 in contact with the fused and melted material or fused cast shape, embodiments described herein are not limited thereto. For example, as previously alluded to, but not illustrated herein, the graphite block 44 can alternatively line the steel box 46 as the back-up layer, in which case the foamed carbon layer 42 can then serve as a surface layer lined on the graphite block 44 for contacting the fused and melted ingot material or fused cast shape. It is also contemplated, but not illustrated, that the foamed carbon layer 60 of the graphite, foamed carbon, and bubble alumina lined ingot mold 56 of FIG. 7 could serve as the surface layer instead of the back-up layer to the graphite block 58.

Further, even though the ingot molds described herein are ideally designed to have nearly the same distance from the center of the ingot to all sides for uniform cooling, embodiments described herein are not limited thereto. For example, the shape of the ingot mold can be a cylinder, a square, a rectangle, or any other shape that would be contemplated by one having ordinary skill in the art. Moreover, the shape of the ingot mold may not be of concern for certain materials or when striving to achieve certain goals. It is also contemplated that the foamed carbon described herein can be used with or without secondary heated furnaces or highly insulated furnace for ingot annealing.

In addition, while the examples described herein largely describe various ingot molds being used for the fusion and melting of MgO, embodiments described herein are not limited thereto. For example, the examples described herein could also be used for the fusion and melting of other oxides, such as, but not limited to, alpha alumina, beta alumina, calcia, chromia, silica, zirconia, silicon carbide, or any combination of such materials. The examples described herein could also be used the fusion and melting of other metallic materials.

It should be appreciated that the embodiments described above are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An ingot mold for curing fused and melted material, the ingot mold comprising:

a steel box;

an oxide-based insulation material layer lining an inner surface of the steel box;

a foamed carbon layer formed over the oxide-based insulation material layer; and a graphite block layer formed over the oxide-based insulation material layer, wherein the foamed carbon layer lines the oxide-based insulation material layer, and wherein the graphite block layer lines the foamed carbon layer to contact the fused and melted material, the fused and melted material being selected from the group consisting of MgO, alpha alumina, beta alumina, calcia, chromia, silica, zirconia, silicon carbide, and any combination thereof.

2. An ingot mold for curing fused and melted material, the ingot mold comprising:

a steel box;

an oxide-based insulation material layer lining an inner surface of the steel box;

a foamed carbon layer formed over the oxide-based insulation material layer; and a graphite block layer formed over the oxide-based insulation material layer, wherein the graphite block layer lines the oxide-based insulation material layer, and wherein the foamed carbon layer lines the graphite block layer to contact the fused and melted material, the fused and melted material being selected from the group consisting of MgO, alpha alumina, beta alumina, calcia, chromia, silica, zirconia, silicon carbide, and any combination thereof.

3. The ingot mold according to claim 1, wherein the oxide-based insulation material layer comprises bubble alumina.

4. The ingot mold according to claim 2, wherein the oxide-based insulation material layer comprises bubble alumina.

5. The ingot mold according to claim 1, wherein a thickness of the foamed carbon layer is in a range from one to twelve inches, wherein a thickness of the graphite block layer is about two inches, and wherein a thickness of the oxide-based material layer is about 2.5 inches.

6. The ingot mold according to claim 1, further comprising:

a lid, comprising:

a steel frame corresponding with a construction of the steel box;

an oxide-based insulation material layer lining an inner surface of the steel frame and corresponding with the oxide-based insulation material layer lining the inner surface of the steel box;

a foamed carbon layer formed inside the steel frame and corresponding with a construction of the foamed carbon layer formed inside the steel box; and a graphite block layer formed inside the steel frame and corresponding with a construction of the graphite block layer formed inside the steel box, wherein the foamed carbon layer of the lid lines the oxide-based insulation material layer of the lid, and wherein the graphite block layer of the lid lines the foamed carbon layer of the lid.

7. The ingot mold according to claim 2, further comprising:

a lid, comprising:

a steel frame corresponding with a construction of the steel box;

an oxide-based insulation material layer lining an inner surface of the steel frame and corresponding with the oxide-based insulation material layer lining the inner surface of the steel box;

a foamed carbon layer formed inside the steel frame and corresponding with a construction of the foamed carbon layer formed inside the steel box; and a graphite block layer formed inside the steel frame and corresponding with a construction of the graphite block layer formed inside the steel box, wherein the graphite block layer of the lid lines the oxide-based insulation material layer of the lid, and wherein the foamed carbon layer of the lid lines the graphite block layer of the lid.

8. The ingot mold according to claim 2, wherein a thickness of the foamed carbon layer is in a range from one to twelve inches, wherein a thickness of the graphite block layer is about two inches, and wherein a thickness of the oxide-based material layer is about 2.5 inches.

\* \* \* \* \*